United States Patent
Park

(10) Patent No.: US 8,581,786 B2
(45) Date of Patent: Nov. 12, 2013

(54) ANTENNA CONNECTOR OF MOBILE COMMUNICATION TERMINAL

(75) Inventor: Chan Young Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 438 days.

(21) Appl. No.: 12/876,692

(22) Filed: Sep. 7, 2010

(65) Prior Publication Data

US 2011/0187625 A1    Aug. 4, 2011

(30) Foreign Application Priority Data

Jan. 29, 2010    (KR) .................. 10-2010-0008412

(51) Int. Cl.
*H01Q 1/24*    (2006.01)
(52) U.S. Cl.
USPC .......................................... 343/702; 343/906
(58) Field of Classification Search
USPC .................................................. 343/702, 906
See application file for complete search history.

(56) References Cited

U.S. PATENT DOCUMENTS

2009/0224982 A1*    9/2009    Isoda et al. .................... 343/702

FOREIGN PATENT DOCUMENTS

JP                2009044326 A    *    2/2009
KR    10-2006-0068927            6/2006

* cited by examiner

*Primary Examiner* — Dieu Duong
(74) *Attorney, Agent, or Firm* — H.C. Park & Associates, PLC

(57) ABSTRACT

A mobile communication terminal includes a main member and a moving member movably joined to the main member. An antenna connector connects and disconnects an antenna to a PCB according to a movement of the moving member. The antenna connector includes: a rail provided in one of the second member and the first member; a connection member moveable along the rail, the connection member being electrically conductive; and a holder to support the connection member on the rail and to which a first cable extending from one of the antenna and the PCB is connected; and a terminal, disposed adjacent to the rail, of a second cable extending from the other of the antenna and the PCB.

18 Claims, 14 Drawing Sheets

ANTENNA CONNECTOR OF MOBILE COMMUNICATION TERMINAL

CROSS-REFERENCE TO RELATED APPLICATION

This application claims priority from and the benefit under 35 U.S.C. §119(a) of Korean Patent Application No. 10-2010-0008412, filed on Jan. 29, 2010, the disclosure of which is herein incorporated by reference.

BACKGROUND

1. Field

This disclosure relates to a mobile communication terminal, and more particularly, to mobile communication terminal in which an antenna and a printed circuit board (PCB) are connected.

2. Discussion of the Background

As various functions of a mobile communication terminal are improved, shapes or is types of the mobile communication terminal have been developed to suit the functions. Recent mobile communication terminals are classified into folder-type mobile communication terminals, slide-type mobile communication terminals, and T-shape mobile communication terminals depending on their shapes and types.

The folder-type mobile communication terminal has a structure in which members of the terminal are folded in a normal mode, i.e. in a standby mode, to be easily carried, and the folded members are unfolded during communication. The slide-type mobile communication terminal has a structure in which members of the terminal are overlapped so as to be easily carried in the standby mode, and the moving member is pushed to be slid in a direction so as to be used during communication. The T-shape mobile communication terminal has a structure developed to change a transverse or longitudinal direction of an image output from a display.

The T-shape mobile communication terminal is divided into a main member and a moving member, and the moving members are classified into a folder-type moving member that is rotated about a hinge of a main member to be folded and unfolded, a slide-type moving member that is slid to a side relative to a main member, and a T-shape moving member that is rotated to be positioned vertically or in parallel to a main member, depending on movements of the moving members as described above. In addition, typically, an antenna is mounted on the moving member and a main printed circuit board (PCB) is disposed in the main member.

FIG. 1A is a schematic view illustrating an antenna connection structure of a conventional T-shape mobile communication terminal. FIG. 1B is a schematic view illustrating the antenna connection structure in a state in which a moving member illustrated in FIG. 1A is rotated to be perpendicular to a main member.

As illustrated in FIG. 1A and FIG. 1B, in the mobile communication terminal 10 is including a main member 11 and a moving member 21, generally, an antenna 23 is disposed in the moving member 21, a PCB 13 is disposed in the main member 11, and a cable 25 connects the antenna 23 to the PCB 13.

However, during the use of the mobile communication terminal 10, as the moving member 21 is slid or rotated, the cable 25 is stressed. Due to the frequent deformation, the cable 25 may be damaged.

In addition, since the cable 25 is connected to the antenna 23 and the PCB 13, line loss occurs along the length of the cable 25, and the antenna gain may be degraded.

SUMMARY

Exemplary embodiments of the present invention provide an antenna connector of a mobile communication terminal having a configuration in which an antenna is connected or disconnected to a PCB as according to a movement of a moving member.

Additional features of the invention will be set forth in the description which follows, and in part will be apparent from the description, or may be learned by practice of the invention.

An exemplary embodiment provides a mobile communication terminal, including: a first member; a second member movably connected to the first member; and an antenna connector to connect and disconnect an antenna and a printed circuit board (PCB) according to a movement of the second member with respect to the first member.

It is to be understood that both the foregoing general description and the following detailed description are exemplary and explanatory and are intended to provide further explanation of the invention as claimed. Other features and aspects will be apparent from the is following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
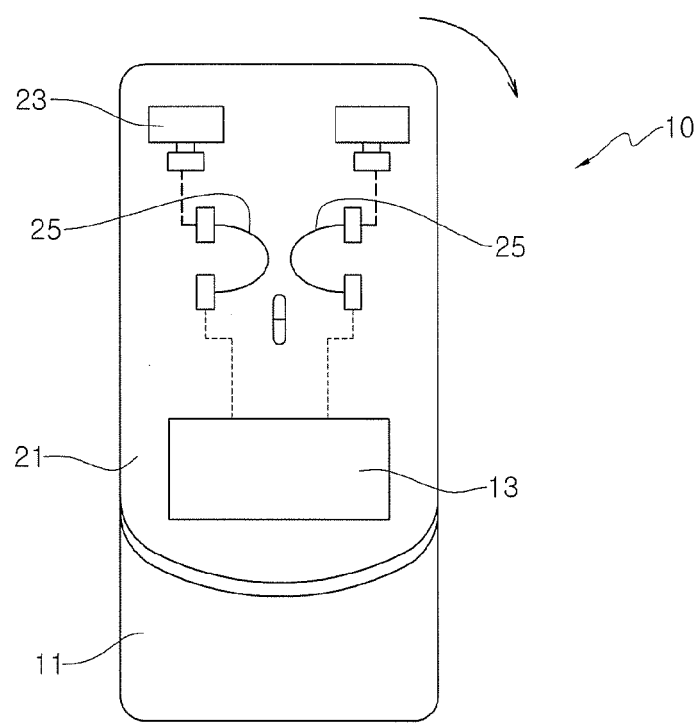
FIG. 1A is a schematic view illustrating an antenna connection structure of an existing T-shape mobile communication terminal.
Figure 1B:
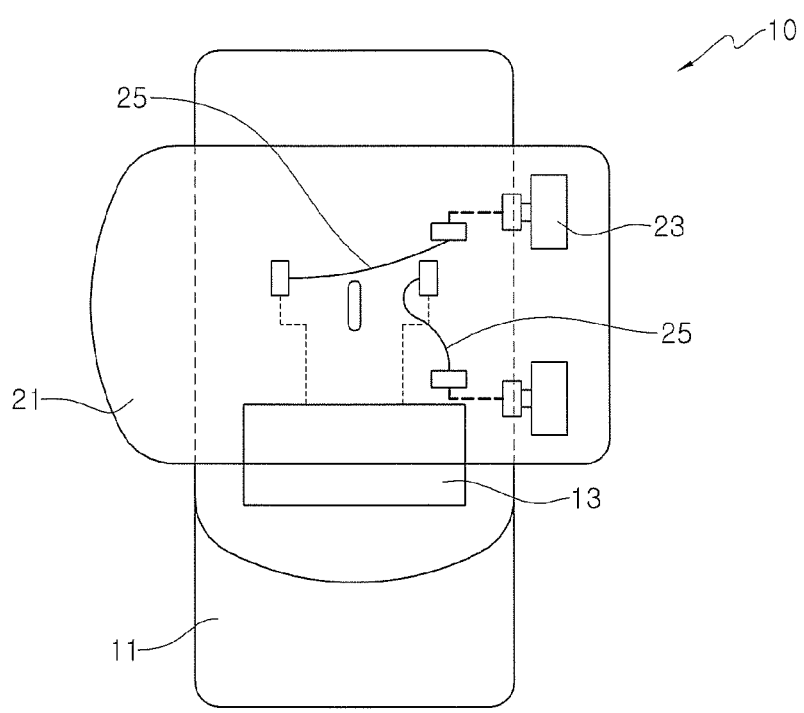
FIG. 1B is a schematic view illustrating the antenna connection structure in a state where a moving member illustrated in FIG. 1A is rotated to be perpendicular to a main member.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or is "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

It will be understood that when an element, such as a layer, film, region, or substrate, is referred to as being "connected to" or "disposed" in, on, or at a region of another element, it can be connected directly to or disposed directly in, on, or at the region of the other element, or intervening elements may also be present. In contrast, when an element is referred to as being "connected directly to" or "disposed directly" in, on, or at the region of the other element, there are no intervening elements present.

Figure 2:
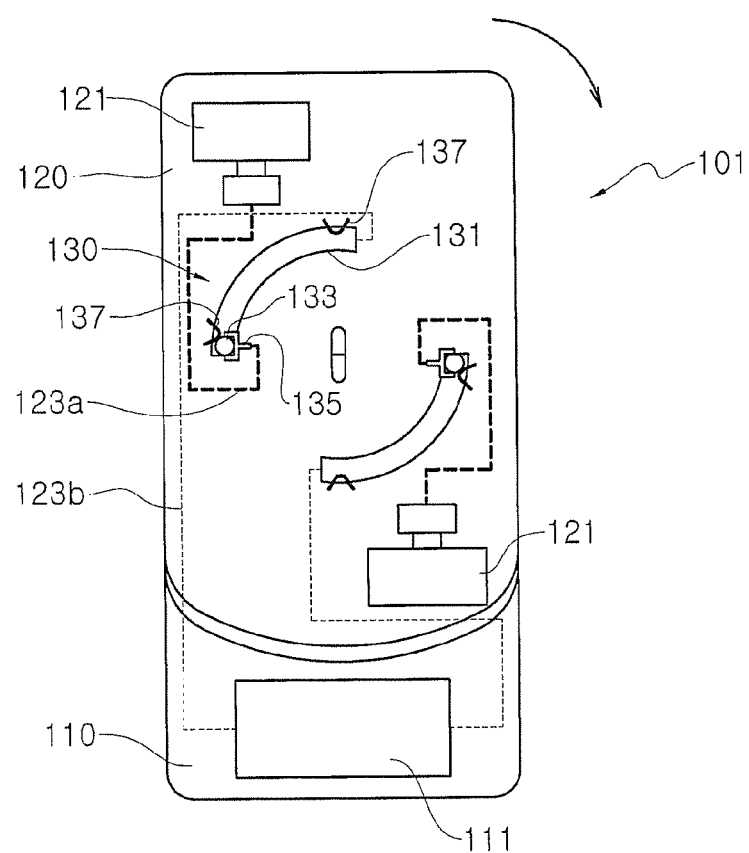
FIG. 2 is a schematic view illustrating an antenna connector of a T-shape mobile communication terminal according to an exemplary embodiment.
Figure 3:
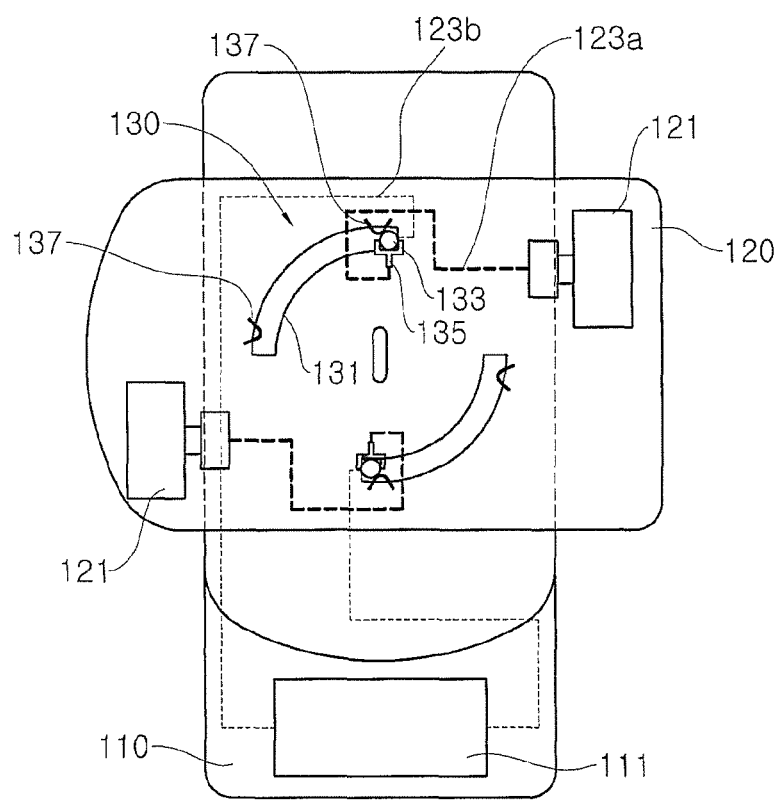
FIG. 3 is a schematic view illustrating a state where a moving member illustrated in FIG. 2 is rotated with respect to a main member.

FIG. 2 is a schematic view illustrating an antenna connector of a T-shape mobile communication terminal according to an exemplary embodiment. FIG. 3 is a schematic view illustrating a state in which a moving member illustrated in FIG. 2 is rotated with respect to a main member.

As illustrated in FIG. 2, the T-shape mobile communication terminal 101 includes is a main member 110 in which a PCB 111 is disposed, and a moving member 120 that is disposed to correspond to the main member 110 and that is rotatable relative to the main member 110. A connector 130 is disposed between the main member 110 and the moving member 120 to connect and disconnect the antenna 121 and the PCB 111 according to the movement of the moving member 120, i.e., according to the rotation of the moving member 120.

As illustrated in FIG. 2 and FIG. 3, the connector 130 disposed between the main member 110 and the moving member 120 and includes a curved rail 131 disposed in the main member 110, a connection member 133 moveable along the rail 131, and a holder 135 disposed in the moving member 120 to support the connection member 133, i.e., the holder 135 prevents the connection member 133 from deviating from the rail 131. A first cable 123a connects the holder 135 and the antenna 121 to each other, and a terminal of a second cable 123b connected to the PCB 111 is positioned at a first end of the rail 131.

Here, the first end of the rail 131 refers to a point at which the connection member 133 is positioned when the moving member 120 is rotated to be perpendicular to the main member 110 as shown in FIG. 3.

That is, while the moving member 120 is rotated clockwise with respect to the main member 110, the connection member 133 supported by the holder 135 is moved along the rail 131. When the connection member 133 is moved along the rail 131 to the first end of the rail 131 and connected to the terminal of the second cable 123b extending from the PCB 111 as shown in FIG. 3, the antenna 121 is electrically connected to the PCB 111 through the connection member 133 and the holder 135.

If the moving member 120 is rotated counterclockwise so as to be parallel to or align with the main member 110 as illustrated in FIG. 2, the connection member 133 supported is by the holder 135 is separated from the first end of the rail 131 at which the terminal of the second cable 123b is positioned, and moved along the rail 131 to a second end of the rail 131 such that the antenna 121 and the PCB 111 are opened, i.e., not connected. However, aspects are not limited thereto such that the mobile communication terminal 101 may include another cable (not shown) connected between the PCB 111 and the second end of the rail 131 so that the antenna 121 and the PCB 111 may be connected when the moving member 120 is disposed to align with the main member 110. Further, the rail 131 may be conductive so that the so that the antenna 121 and the PCB 111 may be connected during the movement of the moving member 120 relative to the main member 110.

The connector 130 may be installed to suit a number of antennas 121 of the mobile communication terminal 101 and the second cable 123b extending from the PCB 111 may be positioned on the first end of the rail 131 of the connector 130. In addition, plural connection members 133 corresponding respectively to each of the rails 131 may be positioned while being supported by the holder 135, and the holder 135 of each of the connectors 130 may be connected to respective antennas 121.

The connection member 133 may have a conductive ball structure. Elastic projections 137 past which the connection member 133 moves are provided along the rail 131. The elastic projection 137 may be a leaf spring and is mounted to at least partially overlap the rail 131. Further, at least one of the elastic projection 137 and the connection member 133 may be elastically deformed while passing each other and then restored. The connection member 133 that is moved to the first end or the second end of the rail 131 is blocked by the elastic projection 137 so as not to move toward the middle of the rail 131. If the moving member 120 is rotated with a force greater than the elastic force of the elastic projection 137, the connection member is 133 may be moved to the opposite end of the rail 131 over the elastic projection 137.

In the connector 130 having the above-mentioned configuration, only when the moving member 120 is rotated clockwise, the antenna 121 and the PCB 111 are connected to each other. In a standby state in which signals are not received as illustrated in FIG. 2, the antenna 121 and the PCB 111 are opened so as not to be electrically connected to each other. Therefore, line losses are decreased in the standby state. In addition, the first cable 123a that connects the antenna 121 to the connector 130 and the second cable 123b that connects the connector 130 to the PCB 111 are not deformed during the rotation of the moving member 120.

According to the configuration of the connector 130, the holder 135 is disposed in the moving member 120, the rail 131 is disposed in the main member 110, and the terminal of the second cable 123b connected to the PCB 111 disposed on the first end of the rail 131. However, a configuration in which the holder 135 is disposed in the main member 110, the rail 131 is disposed in the moving member 120, the holder 135 and the PCB 111 are connected with the first cable 123a, and the terminal of the second cable 123b connects to the antenna 121 may be disposed at the first end of the rail 131 may be implemented.

Figure 4:
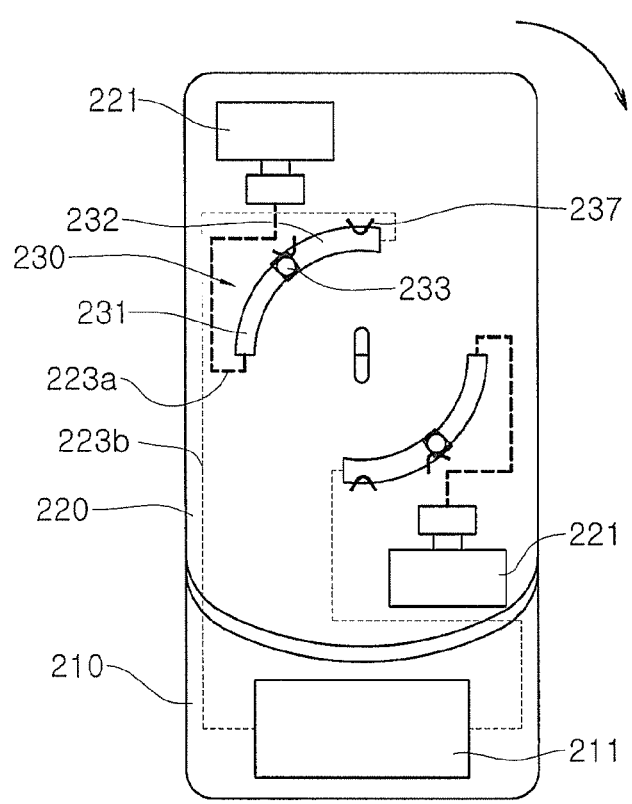
FIG. 4 is a schematic view illustrating an antenna connector of a T-shape mobile communication terminal according to an exemplary embodiment.
Figure 5:
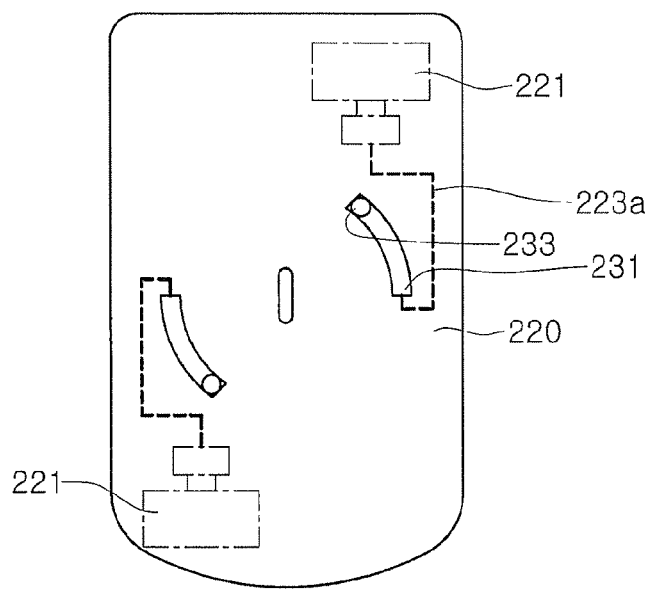
FIG. 5 is a bottom view of the moving member illustrated in FIG. 4.
Figure 6:
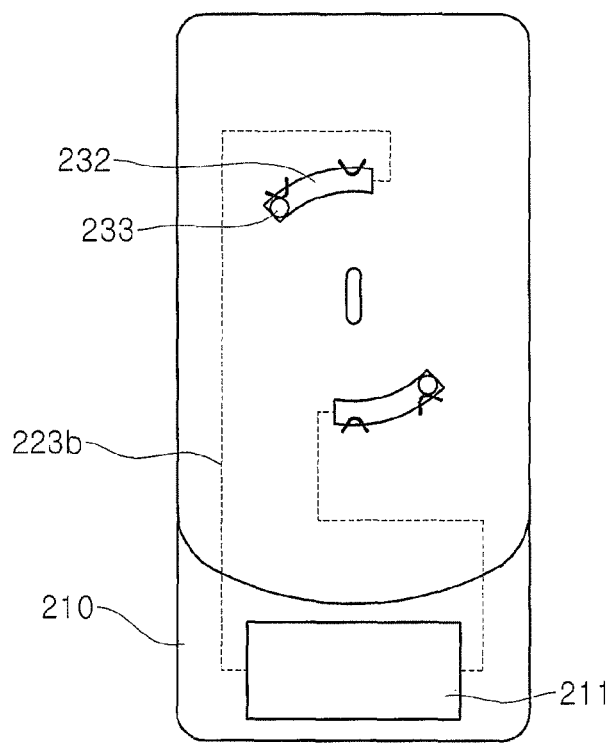
FIG. 6 is a plan view of the main member illustrated in FIG. 4.
Figure 7:
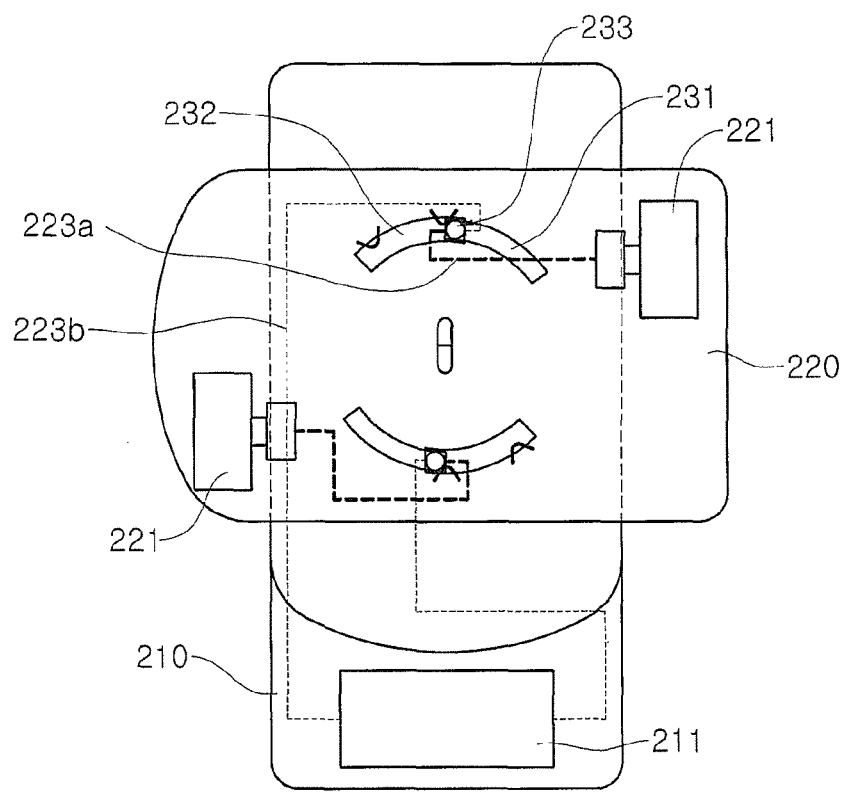
FIG. 7 is a schematic view illustrating a state where an antenna and a PCB are connected to each other by rotating the moving member illustrated in FIG. 4.

FIG. 4 is a schematic view illustrating an antenna connector of a T-shape mobile communication terminal according to an exemplary embodiment. FIG. 5 is a bottom view of the moving member illustrated in FIG. 4. FIG. 6 is a plan view of the main member illustrated in FIG. 4. FIG. 7 is a schematic view illustrating a state in which an antenna and a PCB are connected by rotating the moving member illustrated in FIG. 4.

As illustrated in FIG. 4, FIG. 5, FIG. 6, and FIG. 7, a moving member 220 may be rotated relative to a main member 210. A connector 230 disposed between the moving member 220 and the main member 210 includes a first rail 231 disposed at a bottom surface of the is moving member 220, a second rail 232 disposed at a top surface of the main member 210, and a connection member 233 disposed between the first rail 231 and the second rail 232 to move along the first rail 231 and the second rail 232. The connection member 233 connects a terminal of a first cable 223a connected to a first end of the first rail 231 to a terminal of a second cable 223b connected to a first end of the second rail or allows them to be opened or disconnected.

More specifically, as illustrated in FIG. 5, the bottom surface of the moving member 220, i.e. a surface facing the main member 210, is provided with the curved first rail 231. In addition, the first cable 223a extends from the antenna 221 of the moving member 220 to the first end of the first rail 231, and the terminal of the first cable 223a connected to the antenna 221 is positioned on the first end of the first rail 231.

And, as illustrated in FIG. 6, the top surface of the main member 210 is provided with the second rail 232, which is curved and corresponds to the first rail 231 of the moving member 220, i.e., at least portions of each of the first rail 231 and the second rail 232 overlap. The second cable 223b extends from the PCB 211 disposed in the main member 210 to the first end of the second rail 232 such that the terminal of the second cable 223b connected to the PCB 211 is positioned at the first end of the second rail 232.

The moving member 220 may be rotated between a state in which the moving member 220 and the main member 210 are overlapped to correspond to or align with each other, i.e., a disconnected position, and a state in which the moving member 220 and the main member 210 cross each other, i.e., a connected position. As illustrated in FIG. 4, in the aligned state or disconnected position, the connection member 233 is positioned such that the second end of the first rail 231 and the second end of the second rail 232 overlap with each other. Therefore, the connection member 233 is not connected to the terminal of the first cable 223a or the terminal of the second cable 223b.

In the crossed state or connected position, as illustrated in FIG. 7, when the moving member 220 is rotated clockwise, the moving member 220 is rotated relative to the main member 210 to be perpendicular thereto. Here, the first rail 231 is moved along a circular path with the moving member 220 relative to the second rail 232 provided in the main member 210. As the first rail 231 is moved, the connection member 233 is moved along the first rail 231 and the second rail 232. In the crossed state or connected position, the connection member 233 is positioned at a site at which the first end of the first rail 231 and the first end of the second rail 232 overlap with each other so as to connect the terminal of the first cable 223a to the terminal of the second cable 223b, thereby electrically connecting the antenna 221 and the PCB 211.

Therefore, signals received through the antenna 221 are transmitted to the PCB 211 through the connection member 233 in the connector 230.

If the user rotates the moving member 220 counterclockwise from the crossed state, the first rail 231 is moved along with the moving member 220 such that the connector 233 is separated from the terminal of the first cable 223a and the terminal of the second cable 223b so the connection is electrically opened or disconnected.

As is shown in FIG. 4 and FIG. 7, the first rail 231 may rotate from the position in which the second ends of the first rail 231 and the second rail 232 overlap to the position in which the first ends of the first rail 231 and the second rail 232 overlap, i.e., from a disconnected position to a connected position.

As described above, the antenna 221 is connected to the PCB 211 only when the moving member 220 is rotated to cross the main member 210, and the antenna 221 and the PCB 211 are maintained in the opened state during a normal mode, i.e., during a standby mode. The is first cable 223a and the second cable 223b are not deformed during the rotation of the moving member 220.

If a plurality of antennas 221 are mounted on the moving member 220, a connector 230 corresponding to each of the antennas 221 may be provided to connect the PCB 211 and the plurality of antennas.

Further, the connector 230 may include elastic projections 237, which are similar to the elastic projections 137 described above.

Aspects are not limited such that the mobile communication terminal as described above may include cables (not shown) connected between the PCB 211 and the second end of the second rail 232 and connected between the antenna 221 and the second end of the first rail 231 so that the antenna 221 and the PCB 211 may be connected when the moving member 220 is disposed to align with the main member 210. Further, the first rail 231 and/or the second rail 232 may be conductive so that the so that the antenna 221 and the PCB 211 may be connected during the movement of the moving member 220 relative to the main member 210.

Figure 8:
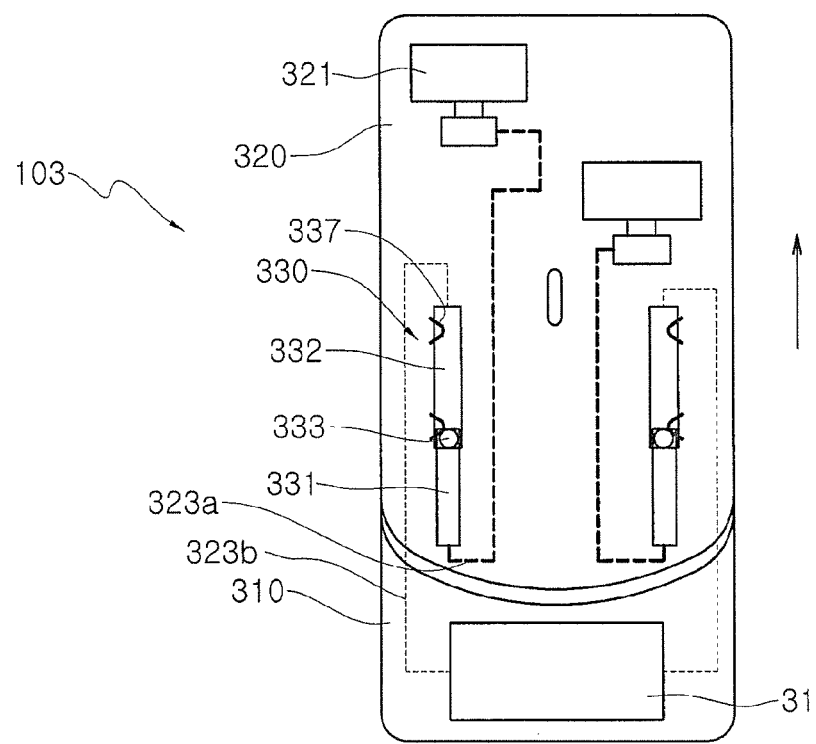
FIG. 8 is a schematic view illustrating an antenna connector of a slide-type mobile communication terminal according to an exemplary embodiment.
Figure 9:
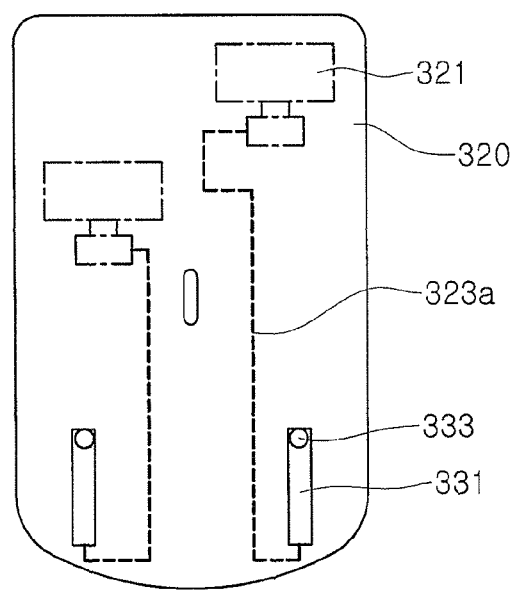
FIG. 9 is a bottom view of the moving member illustrated in FIG. 8.
Figure 10:
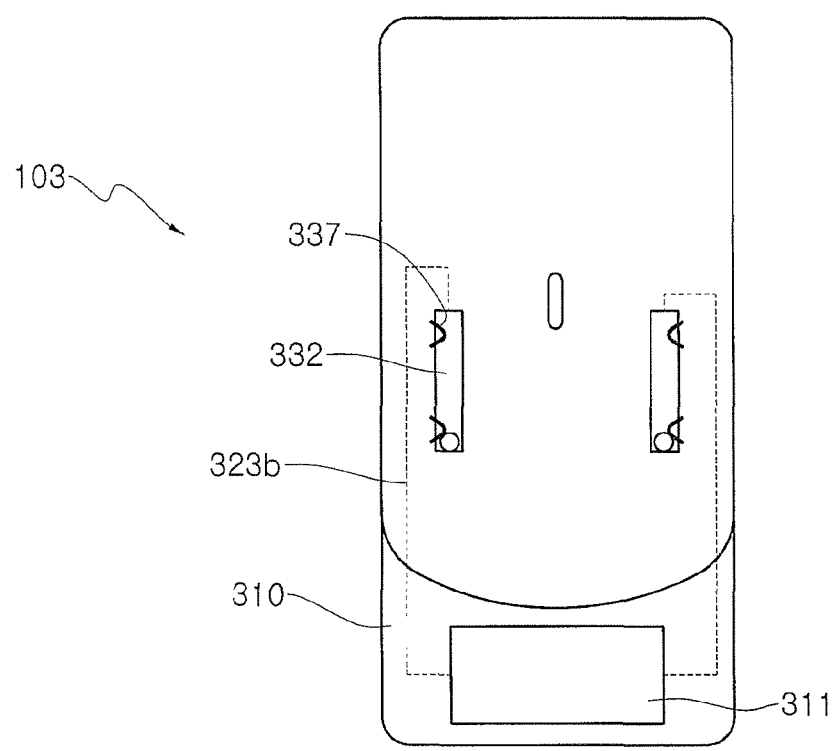
FIG. 10 is a plan view of the main member illustrated in FIG. 8.
Figure 11:
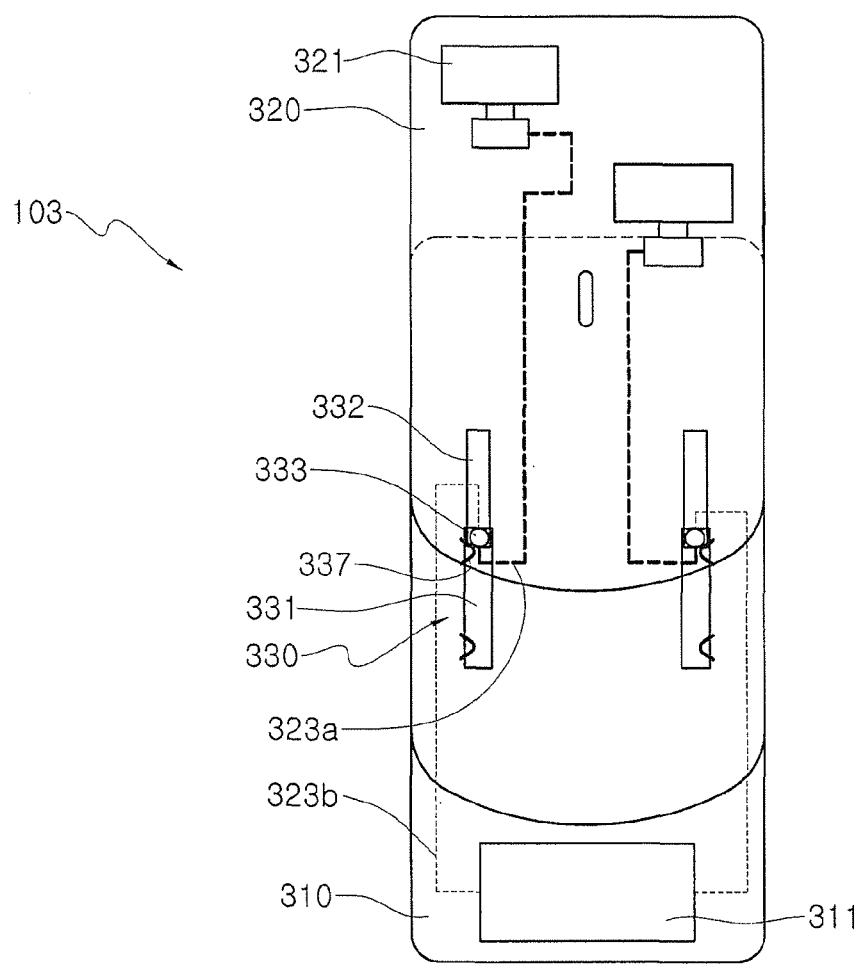
FIG. 11 is a schematic view illustrating a state where an antenna and a PCB are connected to each other by moving the moving member illustrated in FIG. 8.

FIG. 8 is a schematic view illustrating an antenna connector of a slide-type mobile communication terminal according to an exemplary embodiment. FIG. 9 is a bottom view of the moving member illustrated in FIG. 8. FIG. 10 is a plan view of the main member illustrated in FIG. 8. FIG. 11 is a schematic view illustrating a state in which an antenna and a PCB are connected to each other by moving the moving member illustrated in FIG. 8.

As illustrated in FIG. 8, the slide-type mobile communication terminal 103 includes a main member 310 including a PCB 311, and a moving member 320 slidably mounted on the main member 310. The moving member 320 may be slid open in an opening direction or slid closed in a closing direction so as to be overlapped with the main member 310. The opening is direction and the closing direction are parallel and opposite.

In the main member 310 of the slide-type mobile communication terminal 103, a pair of second rails 332 are provided at a top surface of the main member 310 in a longitudinal direction of the main member 310, i.e., in the opening direction, and a pair of first rails 331, which are parallel to and correspond to the second rails 332, are provided at a bottom surface of the moving member 320 facing the main member 310.

A terminal of a first cable 323a connected to an antenna 321 is positioned at a first end (which corresponds to a lower end of the first rail 331 illustrated in FIG. 8, FIG. 9, and FIG. 11) of the first rail 331, and a terminal of a second cable 323 connected to a PCB 311 is positioned at a first end (which corresponds to an upper end of the second rail 332 illustrated in FIG. 8, FIG. 10, and FIG. 11 of the second rail 332.

A connection member 333 is positioned between the first rail 331 and the second rail 332, and elastic projections 337 by which the connection member 333 passes are provided at the first end and a second end of the second rail 332. The second end of the second rail 332 corresponds to a lower end of the second rail 332 illustrated in FIG. 8, FIG. 10, and FIG. 11. The elastic projections 337 have the same configuration as that of the elastic projections 137 as described above. In order for the connection member 333 to pass the elastic projection 337, a force greater than the elastic force of the elastic projection 337 may be applied, and the deformation due to the elastic projection 337 is restored after passing the elastic projection 337.

In the slide-type mobile communication terminal 103 having the above-mentioned configuration, during the general standby mode, the moving member 320 is closed and overlaps the main member 310, and during communication, the moving member 320 is open and extended from the main member 310 in the sliding direction, i.e., in the direction of the first rail is 331 and the second rail 332.

If the user moves the moving member 320 in the sliding direction to extend the length of the slide-type mobile communication terminal 103, the first rail 331 provided in the main member 320 is moved in the sliding direction along with the moving member 320. Here, as illustrated in FIG. 11, the connection member 333 positioned at the first end of the first rail 331 is moved to the first end of the second rail 332 to connect the terminal of the first cable 323a positioned at the first end of the first rail 331 to the terminal of the second cable 323a connected to the first end of the second rail 332. As described above, as the connection member 333 connects the terminals of the first cable 323a and the second cable 323b, the antenna 321 and the PCB 311 are electrically connected.

If the user closes the moving member 320, as illustrated in FIG. 8, the first rail 331 is moved to a lower side of the second rail 332 such that the connection member 333 is separated from the two terminals, and the antenna 321 and the PCB 311 are electrically opened or disconnected. Aspects are not limited such that the mobile communication terminal 103 may include cables (not shown) connected between the PCB 311 and the second end of the second rail 332 and connected between the antenna 321 and the second end of the first rail 331 so that the antenna 321 and the PCB 311 may be connected when the moving member 320 is closed. Further, the first rail 331 and/or the second rail 332 may be conductive so that the so that the antenna 321 and the PCB 311 may be connected during the movement of the moving member 320 relative to the main member 310.

Figure 12:
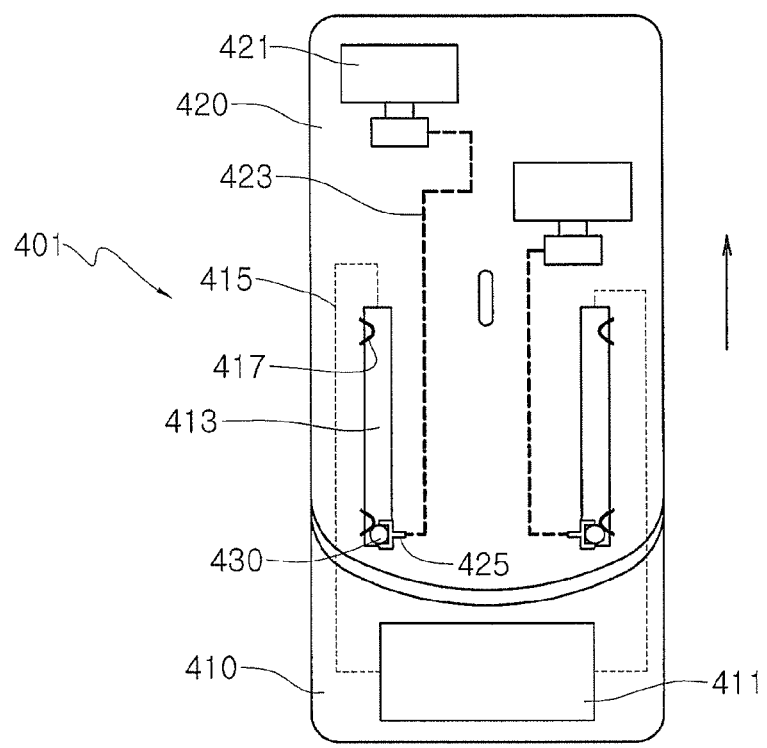
FIG. 12 is a schematic view illustrating an antenna connector of the slide-type mobile communication terminal according to an exemplary embodiment.
Figure 13:
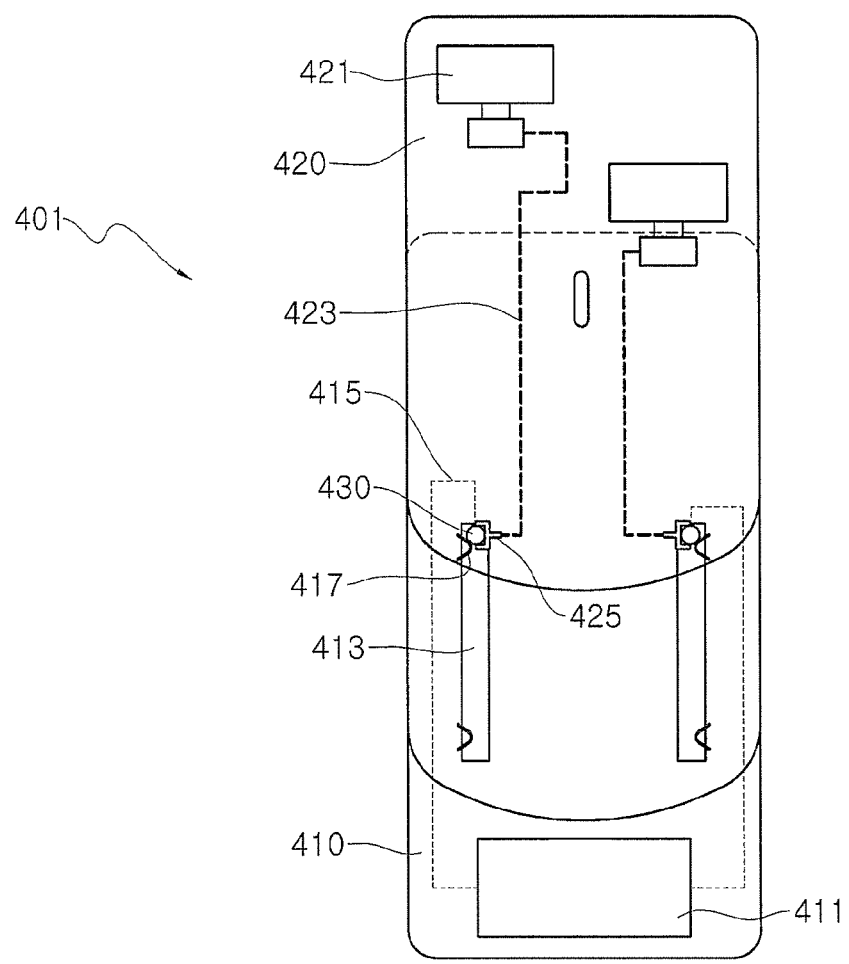
FIG. 13 is a schematic view illustrating a state where an antenna and a PCB are connected by moving the moving member illustrated in FIG. 12.

FIG. 12 is a schematic view illustrating an antenna connector of the slide-type mobile communication terminal according to an exemplary embodiment. FIG. 13 is a schematic view illustrating a state in which an antenna and a PCB are connected by moving the moving is member illustrated in FIG. 12.

As illustrated in FIG. 12 and FIG. 13, in the slide-type mobile communication terminal 401, the antenna 421 is disposed in the moving member 420, and the PCB 411 is disposed in the main member 410. A holder 425 to which a first cable 423 extending from the antenna 421 is disposed on the moving member 420, and a rail 413 is provided in the main member 410 in a sliding direction of the moving member 420. In addition, a terminal of a second cable 415 extending from the PCB 411 is positioned at a first end or upper end of the rail 413. Here, the first end of the rail 413 is a point at which the holder 425 is positioned when the moving member 420 is extended from the main member 410.

Therefore, if the user extends the moving member 420, the holder 425 mounted on the moving member 420 is moved to the upper or first end of the rail 413 along the rail 413 while accommodating a connection member 430, and the connection member 430 is connected to the terminal of the second cable 415 positioned at the upper end of the rail 413. Therefore, the antenna 421 and the PCB 411 are connected through the connection member 430. In this state, when the user closes the moving member 420 to overlap with the main member 410, the connection member 430 passes an elastic projection 417 and moves to a second end or lower end of the rail 413 in the movement direction of the moving member 420 to disconnect the antenna 421 and the PCB 411.

However, aspects are not limited thereto such that the mobile communication terminal 410 may include another cable (not shown) connected between the PCB 411 and the second end of the rail 413 so that the antenna 421 and the PCB 411 may be connected when the moving member 420 is closed. Further, the rail 413 may be conductive so that the so that the antenna 421 and the PCB 411 may be connected during the movement of the moving member is 420 relative to the main member 410.

As described above, the rail 413 is provided in the main member 410, and the holder 425 is provided in the moving member 420. However, the rail 413 may be provided in the moving member 420, and the holder 425 may be provided in the main member 410.

FIGS. 2 through 7 are described as related to the T-shape mobile communication terminal 101, and FIGS. 8 through 13 are described as related to the slide-type mobile communication terminal 103. A connector as described above may also be provided in folder-type mobile communication terminals. The folder-type mobile communication terminal, having a moving member and a main member that are folded or unfolded on a hinge, may have a configuration in which a second rail is provided at a site connected from the hinge to the main member, a first rail is provided at a site connected to the moving member, and a connection member is positioned in the first and second rails.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile communication terminal, comprising:
a first member;
a second member movably connected to the first member; and
an antenna connector to connect and disconnect an antenna and a printed circuit board (PCB) according to a movement of the second member with respect to the first member, wherein the antenna connector comprises:
a rail provided in one of the second member and the first member;
a connection member moveable along the rail, the connection member being electrically conductive; and
a holder to support the connection member on the rail and to which a first cable extending from one of the antenna and the PCB is connected; and
a terminal, disposed adjacent to the rail, of a second cable extending from the other of the antenna and the PCB,
wherein the connection member connects and disconnects the holder and the terminal according to the movement of the second member with respect to the first member.

2. The mobile communication terminal of claim 1,
wherein the movement of the second member relative to the first member comprises rotation, and
wherein the rail is curved and the connection member is moveable along the rail as the second member is rotated.

3. The mobile communication terminal of claim 1,
wherein the movement of the second member relative to the first member comprises sliding in a sliding direction, and
wherein the rail extends in the sliding direction and the connection member is moveable along the rail as the second member is slid.

4. The mobile communication terminal of claim 1, wherein the antenna connector comprises:
an elastic projection disposed to extend across at least a portion of the rail,
wherein the connection member passes by the elastic projection in movement from a connected position to a disconnected position and in movement from the disconnected position to the connected position.

5. The mobile communication terminal of claim 1, wherein the antenna connector connects the terminal and holder if the second member is rotated to cross the first member.

6. The mobile communication terminal of claim 1, wherein the antenna connector connects the terminal and the holder if the second member is slid open with respect to the first member.

7. The mobile communication terminal of claim 1, wherein the antenna connector disconnects the terminal and the holder if the second member is rotated to align with the first member.

8. The mobile communication terminal of claim 1, wherein the antenna connector disconnects the terminal and the holder if the second member is slid closed with respect to the first member.

9. A mobile communication terminal, comprising:
a first member;
a second member movably connected to the first member; and
an antenna connector to connect and disconnect an antenna and a printed circuit board (PCB) according to a movement of the second member with respect to the first member, wherein the antenna connector comprises:
a first rail provided in the second member;
a second rail provided in the first member;
a connection member disposed between and moveable between the first rail and the second rail;
a first terminal, disposed adjacent to a first end of the first rail, of a first cable extending from the antenna; and
a second terminal, disposed adjacent to a first end of the second rail, of a second cable extending from the PCB,
wherein the connection member connects and disconnects the first terminal and the second terminal according to the movement of the second member with respect to the first member.

10. The mobile communication terminal of claim 9,
wherein the movement of the second member relative to the first member comprises rotation, and
the first rail and the second rail are curved and the connection member is moveable along the rail as the second member is rotated.

11. The mobile communication terminal of claim 9,
wherein the movement of the second member relative to the first member comprises sliding in a sliding direction, and
wherein the first rail and the second rail extend in the sliding direction and the connection member is moveable between the first rail and the second rail as the second member is slid.

12. The mobile communication terminal of claim 9, wherein the antenna connector comprises:
an elastic projection disposed to extend across at least a portion of the first rail and the second rail,
wherein the connection member passes by the elastic projection in movement from a connected position to a disconnected position and in movement from the disconnected position to the connected position.

13. The mobile communication terminal of claim 9, wherein the antenna connector connects the first terminal and the second terminal if the second member is rotated to cross the first member.

14. The mobile communication terminal of claim 9, wherein the antenna connector connects the first terminal and the second terminal if the second member is slid open with respect to the first member.

15. The mobile communication terminal of claim 9, wherein the antenna connector disconnects the first terminal and the second terminal if the second member is rotated to align with the first member.

16. The mobile communication terminal of claim 9, wherein the antenna connector disconnects the first terminal and the second terminal if the second member is slid closed with respect to the first member.

17. A mobile communication terminal, comprising:
a first member comprising a printed circuit board (PCB);
a second member movably connected to the first member, the second member comprising an antenna; and
an antenna connector to connect the antenna and the PCB, the antenna connector comprising:
a rail provided in one of the first member and the second member;
a connection member moveable along the rail, the connection member being electrically conductive; and
a holder to support the connection member on the rail and to which a first cable extending from one of the antenna and the PCB is connected; and
a terminal, disposed adjacent to the rail, of a second cable extending from the other of the antenna and the PCB,
wherein the connection member connects and disconnects the holder and the terminal according to the movement of the second member with respect to the first member.

18. A mobile communication terminal, comprising:
a first member comprising a printed circuit board (PCB);
a second member movably connected to the first member, the second member comprising an antenna; and
an antenna connector to connect the antenna and the PCB, the antenna connector comprising:
a first rail provided in the first member;
a second rail provided in the second member;
a connection member disposed between and moveable between the first rail and the second rail;
a first terminal, disposed adjacent to a first end of the first rail, of a first cable extending from the PCB; and
a second terminal, disposed adjacent to a first end of the second rail, of a second cable extending from the antenna.

* * * * *